US006611764B2

(12) United States Patent
Zhang

(10) Patent No.: US 6,611,764 B2
(45) Date of Patent: Aug. 26, 2003

(54) METHOD AND SYSTEM FOR DETERMINING P-WAVE AND S-WAVE VELOCITIES FROM MULTI-COMPONENT SEISMIC DATA BY JOINT VELOCITY INVERSION PROCESSING

(75) Inventor: Yaohui Zhang, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 20 days.

(21) Appl. No.: 09/877,316

(22) Filed: Jun. 8, 2001

(65) Prior Publication Data

US 2003/0021184 A1 Jan. 30, 2003

(51) Int. Cl.⁷ ................................. G01V 1/28
(52) U.S. Cl. ........................................ 702/18
(58) Field of Search ...................... 702/18, 14, 17; 367/73, 75

(56) References Cited

U.S. PATENT DOCUMENTS

| | | | |
|---|---|---|---|
| 4,577,297 A | | 3/1986 | Kalkomey et al. |
| 4,736,347 A | * | 4/1988 | Goldberg et al. ............. 702/18 |
| 4,881,209 A | | 11/1989 | Bloomquist et al. |
| 4,964,088 A | * | 10/1990 | Chittineni ..................... 702/18 |
| 5,579,282 A | | 11/1996 | Barr |
| 5,587,968 A | * | 12/1996 | Barr ............................. 367/54 |
| 5,999,489 A | * | 12/1999 | Lazaratos .................... 367/73 |
| 6,067,275 A | * | 5/2000 | Sayers ......................... 702/18 |
| 6,128,580 A | * | 10/2000 | Thomsen ...................... 702/18 |

FOREIGN PATENT DOCUMENTS

GB        2295014 A        11/1995

OTHER PUBLICATIONS

Seismic Velocities from Surface Measurements, Geophysics, vol. 20, No. 1, Jan. 1955, pp. 68–86, Dix, C. Hewitt.

Velocity Spectra–Digital Computer Derivation and Applications of Velocity Functions, M. Turhan Taner and Fulton Koehler, 37$^{th}$ Annual International SEG Meeting, Nov. 2, 1967, pp. 859–875.

* cited by examiner

*Primary Examiner*—Donald E. McElheny, Jr.
(74) *Attorney, Agent, or Firm*—E. Eugene Thigpen

(57) ABSTRACT

A method is disclosed for determining compressional (P) wave and shear (S) wave velocities from seismic data acquired using multiple component receivers. The method includes estimating interval velocity of P waves from earth's surface to a first reflector from P wave arrivals in the seismic data. A interval ratio of P wave to S wave velocity is estimated from earth's surface to the first reflector from P-S wave arrivals in the seismic data. An S wave interval velocity is estimated from the estimated P wave interval velocity and interval ratio. A depth is determined from the earth's surface to the first reflector using each of the P wave and S wave estimated interval velocities, the depths to the first reflector estimated using each of the P wave and S wave estimated interval velocities are balanced.

12 Claims, 13 Drawing Sheets

METHOD AND SYSTEM FOR DETERMINING P-WAVE AND S-WAVE VELOCITIES FROM MULTI-COMPONENT SEISMIC DATA BY JOINT VELOCITY INVERSION PROCESSING

CROSS REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

The present invention relates generally to the field of seismic data acquistion and processing.

A novel method and system of extraction of accurate compressional wave and shear wave velocities from land and marine multicomponent seismic data with improved quality and new information concerning the earth's subsurface geological imaging and lithologic properties are disclosed. Additionally, an improved multicomponent seismic exploration technique is disclosed in which multicomponent seismic data is acquired and processed with more accurate velocities to produce better image and to extract more useful lithology information from the acquired data.

In conventional seismic data processing, the Dix equation is used to replace a stack of layers with a single layer of the same form to derive moveout P-wave velocity and interval velocities. In the standard P-wave case, the layers are parameterized by zero-offset travel time and moveout velocity. P–S converted wave velocity analysis follows the same methodology, but use layers parameterized by zero offset time, P-wave velocity, and S-wave velocity instead. Because it is difficult to estimate two velocity parameters simultaneously, the P-wave velocities are picked in the standard migration velocity analysis from P—P data. The velocity ratio of RMS S-wave velocity divided by RMS P-wave are estimated for each zero-offset converted wave time by performing a non-hyperbolic Vs/Vp ratio coherency scan on the P–S converted wave data.

Taner and Koehler (1969) showed that the travel times of P—P and S—S reflected waves in a horizontally-layered medium are accurately approximated using a truncated power series, standard Dix-style P—P and S—S wave velocity analysis methods are based on this theory with the moveout power series truncated at the hyperbolic term. The type of velocity estimation method is not as useful for multicomponent processing as it is for P—P and S—S processing. For P–S converted wave processing, the moveout is not exactly hyperbolic even for the case of a single homogeneous layer. P–S converted wave processing algorithms based on hyperbolic moveout are useful only when the source-to-receiver offset is small compared to the target depth of the reflector. The traditional first-order approximation for P–S converted wave velocity analysis cannot provide accurate velocity information. The velocity and travel time errors largely occur for the shallow reflectors. These shallow errors will propagate, causing errors for deeper layers in the velocity inversion. The RMS velocity errors may propagate to the interval velocity. It is very difficulty to detect the accuracy of the interval velocities obtained from the Dix equation using simple hyperbolic approach. Therefore, there is a long felt need for a new method for extraction of accurate P-wave and S-wave velocities from multicomponent seismic data.

SUMMARY OF THE INVENTION

In one embodiment of the present invention, a novel method and system of geophysical exploration utilizing joint velocity inversion to extract accurate P-wave and S-wave interval velocities from multicomponent seismic data is provided. The measured P-wave and S-wave velocities are useful for many other seismic data processing to produce enhanced seismic traces for the upgraded delineation of subsurface structures and for the extraction of lithologic information. The geophysical exploration method comprises multicomponent seismic data pre-processing and interpretation.

In a further embodiment, a multicomponent seismic survey is laid out to acquire compressional wave data, and compressional to shear wave and shear wave to compressional wave (P–S) data without regard for or knowledge of the geological character of the earth's surface and sub-surface formations. Seismic energy is imparted into earth's sub-surface and multicomponents of the seismic signals were detected and recorded at selected receiver locations.

A further embodiment of the present invention comprises a method to accurately measure the effective P-wave and S-wave velocities using joint inversion, which allows us to treat the earth's subsurface as a system and find out the linear or non-linear system response from acquired seismic data. It has the advantage of allowing the extraction of P-wave and S-wave velocities from the acquired seismic data without knowledge of the subsurface geology by an iterating process. This iterating process builds a stable velocity model by joint velocity inversion.

In a further embodiment, the method further comprises a velocity field decomposition and reconstruction to derive the wanted velocities. The estimated initial velocities are decomposed into an invertible form for the derivation of the P-wave and S-wave interval velocities. This process is different from conventional velocity inversion by Dix equation. It requires the use of at least two components of acquired seismic data (the vertical component and one of the horizontal components) in order to perform the joint velocity inversion.

In an even further embodiment, the method further comprises a down going and up coming layer stripping process to extract and balance the derived P-wave and S-wave interval velocities with depth-consistency. A velocity correction and balance is established to produce accurate interval velocities in each layer preventing the error propagation. It is a dynamic and iterative process to ensure the accuracy of the derived interval velocities for imaging earth sub-surface structure and extracting lithology information from acquired multicomponent seismic data.

In an even further embodiment, the method further comprises a time and depth conversion for both velocity field and seismic data. The time and depth conversion produces more accurate velocity field in depth allowing the construction of velocity model for pre-stack migration and other processing.

In a further embodiment, a new method and system of multicomponent geophysical exploration is disclosed utilizing joint velocity inversion to extract accurate P-wave and S-wave interval velocities from multicomponent seismic data.

In still a further embodiment, a method of seismic signal processing is provided. The method comprises receiving seismic data, and extracting at least one velocity from said seismic data.

In a further embodiment, a system of seismic signal processing is provided. The method comprises receiving seismic data, and extracting at least one velocity from said seismic data.

In an even further embodiment, a seismic data point is provided. The seismic data point is produced by a process comprising receiving seismic data; and extracting at least one velocity from said seismic data.

BRIEF DESCRIPTION OF THE DRAWINGS

The present invention is better understood by reading the following description of non-limiting embodiments with reference to the attached drawings.

DETAILED DESCRIPTION OF THE INVENTION

Those of ordinary skill in the art will appreciate that for the purpose of teaching the broad aspect of the present invention, example embodiments of the invention are described in detail.

Figure 1:
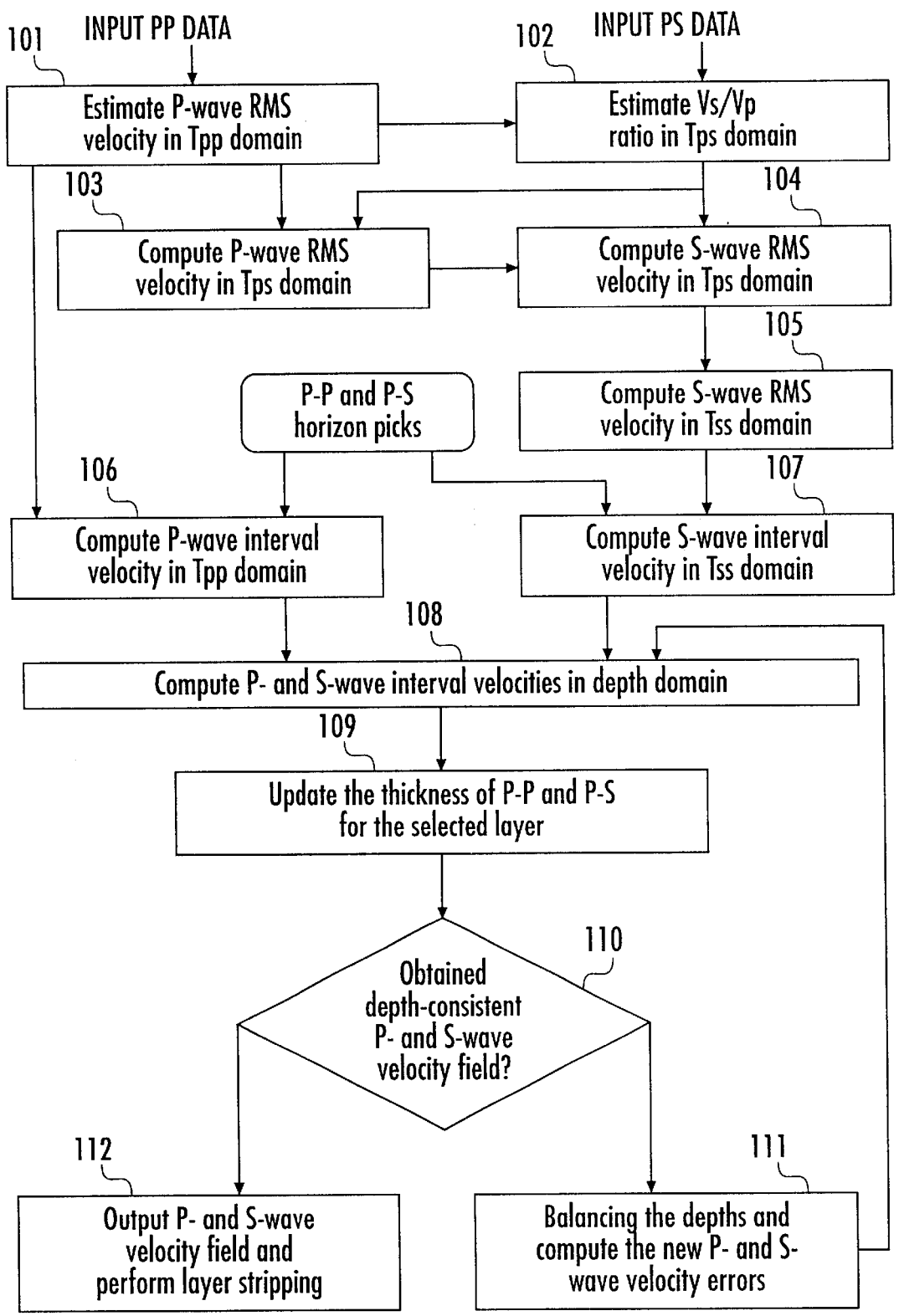
FIG. 1 is a diagram demonstrating aspects of an example embodiment the invention.

In one example embodiment of the present invention, as illustrated in FIG. 1, the recorded P—P and P–S seismic traces representing the reflections of compressional to compressional wave and compressional to shear wave seismic energies reflected from subsurface formations are provided as input to the joint velocity inversion process.

Figure 2:
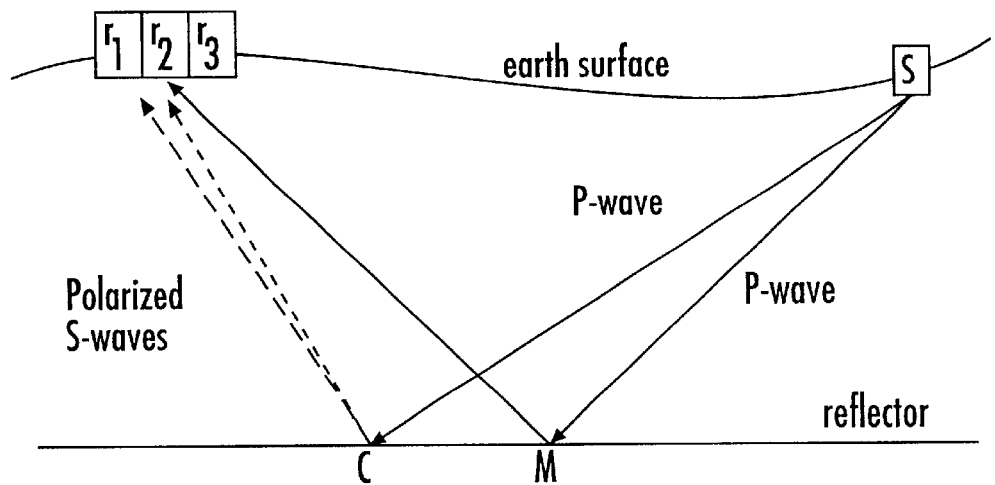
FIG. 2 is a diagram of aspects of an example embodiment of the invention from a cross section of the earth in the land environment.
Figure 3:
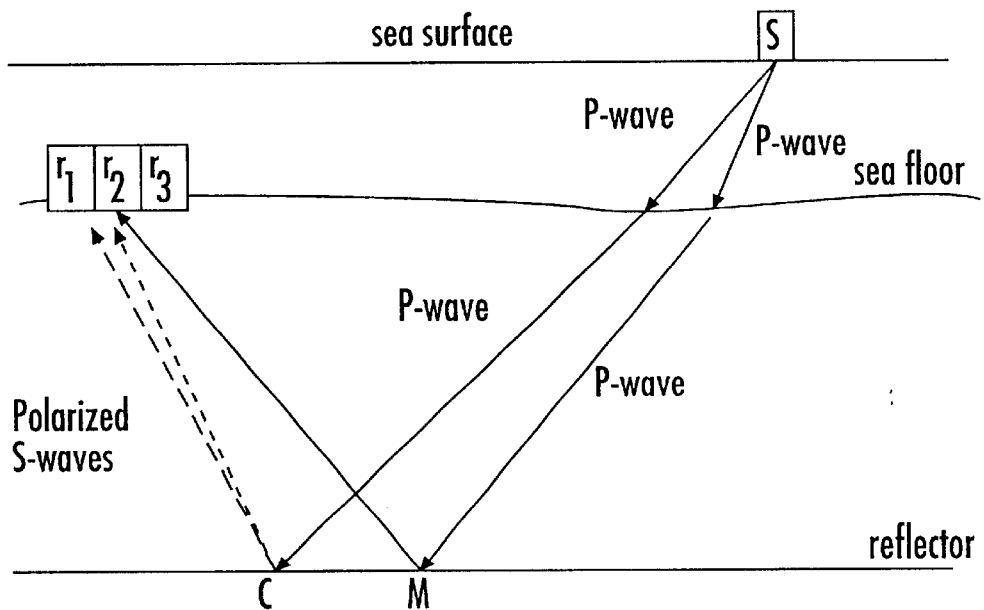
FIG. 3 is a diagram of aspects of an example embodiment of the invention from a cross section of the earth in the marine environment.

In a further embodiment, as shown in FIG. 2 and FIG. 3, a set of seismic sources and a set of multicomponent seismic receivers are located at specified locations in a seismic survey. Each set of seismic sources is laid out to impart seismic energy into the earth's subsurface at a specified locations in the seismic survey. Each set of multicomponent seismic receivers R is laid out to detect and to record multicomponents of the imparted seismic wave energy reflected from the subsurface geology. In an further embodiment, the elements in the set of seismic receivers R comprise linearly independent component r1, r2, and r3 to record different polarized seismic wave energy.

In a further embodiment, physically, the wanted seismic wave energy detected and recorded in the multicomponent receivers are classified into two types: P—P and P–S reflections. In P—P reflection, imparted P-wave seismic energy is reflected at a subsurface reflector and reflected back to the receiver as P-wave. In the P–S reflection, the imparted P-wave seismic energy is converted into S-wave energy and reflected back to the receiver as polarized S-wave. In alternate embodiments, any data that will occur to those of ordinary skill in the art is used.

Figure 4:
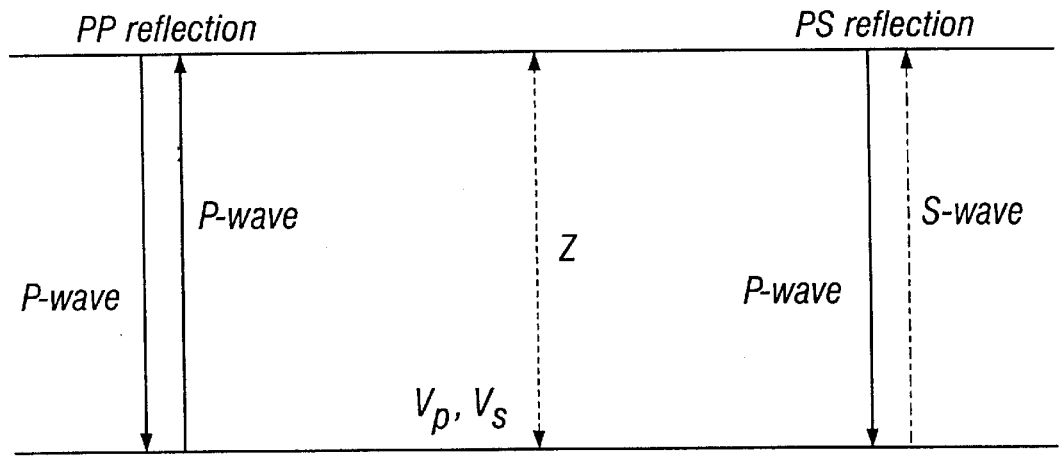
FIG. 4 is a diagram of aspects of an example embodiment of the invention for a single layer for depth-consistent velocity model.
Figure 5:
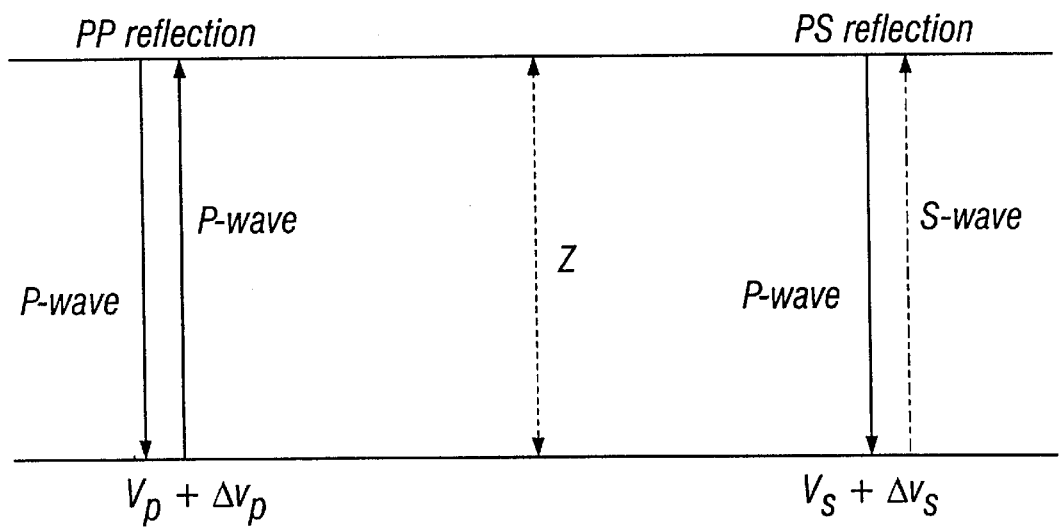
FIG. 5 is a diagram of aspects of an example embodiment of the invention for a single layer model for velocity iteration.

In a further embodiment, mathematically, after migration and zero offset mapping processing, the travel time of the detected P-wave and P–S converted wave is represented in the following equations (see FIG. 4):

$$t_{pp} = \frac{2z}{v_p} \qquad \text{Eq. (1)}$$

and $$t_{ps} = \frac{z}{v_p} + \frac{z}{v_s} \qquad \text{Eq. (2)}$$

where Vp is the P-wave velocity and Vs is the S-wave velocity, respectively; z is the depth of horizon; and $t_{pp}$ and $t_{ps}$ are the two-way travel time for P—P and P–S reflections, respectively. In an even further embodiment, the two-way travel time of pure S-wave travel time is also calculated by:

$$t_{ss} = \frac{2z}{v_s} \qquad \text{Eq. (3)}$$

In an even further embodiment, the relationships among $t_{ps}$, $t_{pp}$, and $t_{ss}$, are defined by $$t_{pp} = \frac{2G}{1+G} t_{ps} \qquad \text{Eq. (4)}$$

$$t_{ss} = \frac{2}{1+G} t_{ps} \qquad \text{Eq. (5)}$$

where G=Vs/Vp is the ratio of S-wave velocity to P-wave velocity.

In still further embodiments, as shown in FIG. 1, the P—P and P–S joint velocity inversion is completed using the following:

101: Estimating P-wave RMS velocity from P-wave data;

102: Estimating RMS Vs/Vp ratio from P–S data;

103: Compute P-wave RMS velocity in Tps domain from the results of steps 101 and 102;

104: Compute the RMS Vs/Vp ratio in Tps domain from the output of steps 101 and 103;

105: Compute the RMS S-wave velocity in Tss domain;

106: Compute the interval P-wave interval velocity in Tpp domain;

107: Compute the interval S-wave interval velocity in Tss domain;

108: Compute P- and S-wave interval velocities in depth domain;

109: Update the computed thicknesses of P—P and P–S for the selected layer;

110: Check depth-consistent P- and S-wave velocity fields;

111: If depth-consistent velocity field is not obtained, balancing the depths and compute new velocity errors for both P-wave and S-wave velocities 112: If depth-consistent velocity field obtained, output the inverted interval P-wave and S-wave velocities and perform layer stripping and repeat 108 to 112 for next layer's joint inversion.

In a further embodiment, the Vp(x,y,$t_{pp}$) at step 101, is estimated from migration velocity analysis. In yet a further embodiment, the P-wave velocities picked in the P—P data are taken as input to the P–S data to scan the velocity ratio of RMS S-wave velocity divided by RMS P-wave velocity in step 102. In an even further embodiment, the velocity ratio is estimated for each zero-offset converted wave time by performing a non-hyperbolic Vs/Vp ratio coherency scan on the P–S converted wave data. In an even further embodiment, using the results from step 102, the P-wave RMS velocity in $t_{pp}$ domain, Vprms(x,y,$t_{pp}$), then mapped to $t_{ps}$ domain at step 103, Vprms(x,y,$t_{ps}$). In a further embodiment, the RMS Vp and Vs/Vp are now in the $t_{ps}$ domain which allows the computation of S-wave RMS velocities in $t_{ps}$ domain. Vsrms(x,y,$t_{ps}$) is computed at step 104 by a simple multiplication.

$$Vs_{rms}(x,y,t_{ps}) = G_{rms}(x,y,t_{ps})Vp_{rms}(x,y,t_{ps}) \quad \text{Eq. (6)}$$

In still a further embodiment, the Vsrms(x,y,$t_{ps}$) is then mapped to $t_{ss}$ domain, Vsrms(x,y,$t_{ss}$), at step 105 allowing the application of generalized Dix equation to compute the initial interval S-wave velocities. In a further embodiment, the picked P—P and P–S horizons are input to steps 106 and 107 to compute the initial interval velocities for P-wave in $t_{pp}$ domain, $Vp_{int}$(x,y,$t_{pp}$), and for S-wave in $t_{ss}$ domain, $Vs_{int}$(x,y,$t_{ss}$), by Equation (7).

$$v_{int}^2(N) = \frac{[T(N) - t_c]v_{rms}^2(N) - [T(N-1) - t_c]v_{rms}^2(N-1)}{\Delta t(N)} \quad \text{Eq. (7)}$$

where $t_c$ is one way P-wave vertical travel time from source to receiver when sources and receivers are placed at different datum planes.

In yet a further embodiment, the initial $Vp_{int}$(x,y,$t_{pp}$) and $Vs_{int}$(x,y,$t_{ss}$) are input to step 108 to compute both P-wave and S-wave interval velocities in depth. In reality, the correct P- and S-wave velocities and the depth are unknown. In a further embodiment, the depth of a selected horizon layer is determined either by P-wave velocity and P-wave travel time or by S-wave velocity and S-wave travel time.

$$z_p = \frac{t_{pp}v_p}{2} \quad \text{Eq. (8)}$$

and $$z_s = \frac{t_{ss}v_s}{2} \quad \text{Eq. (9)}$$

In a further embodiment, the true depth is a function of true $v_p$, $t_{pp}$, $v_s$, and $t_{ss}$ $$z=z(t_{pp},84_p,t_{ss},84_s) \quad \text{Eq. (10)}$$

In an even further embodiment, the initial P- and S-wave velocities are estimated from the P—P and P–S travel times from the seismic data. Obviously, correct knowledge of the P-wave velocity is very important for the converted wave velocity analysis and inversion to work properly. Incorrect P-wave velocities will cause errors in estimating Vs/Vp ratio for converted-wave data. It is difficult to produce a depth-consistent velocity field if the correct P-wave and S-wave velocities are not obtained. In still a further embodiment, the updated interval velocities (step 108) for both P and S-waves are determined by introducing velocity error tolerances, $\Delta v_p$ and $\Delta v_s$.

$$v_p(\text{new})=v_p(\text{old})+\Delta v_p \quad \text{Eq. (11)}$$

$$v_s(\text{new})=v_s(\text{old})+\Delta v_s \quad \text{Eq. (12)}$$

In a further embodiment, the new depth is updated at step 109

$$z(v_p, t_{pp}, v_s, t_{ss}) = \frac{1}{4}[t_{pp}(v_p + \Delta v_p) + t_{ss}(v_s + \Delta v_s)] \quad \text{Eq. (13)}$$

and, in a further embodiment, the optimized depth-consistent velocity field (step 110) is computed by the minimization of $$\text{Minimizing}\{d(t_{pp}, v_p, \Delta v_p, t_{ss}, v_s, \Delta v_s)^2\} \quad \text{Eq. (14)}$$

where $$d(t_p, v_p, \Delta v_p, t_s, v_s, \Delta v_s) = \frac{\Delta z_p + \Delta z_s}{2} \quad \text{Eq. (15)}$$

and $$\Delta z_p = z(vv_p, t_{pp}, v_s, t_{ss}) - z_p \quad \text{Eq. (16)}$$

$$\Delta z_s = z(vv_p, t_{pp}, v_s, t_{ss}, z) - z_s \quad \text{Eq. (17)}$$

Figure 6:
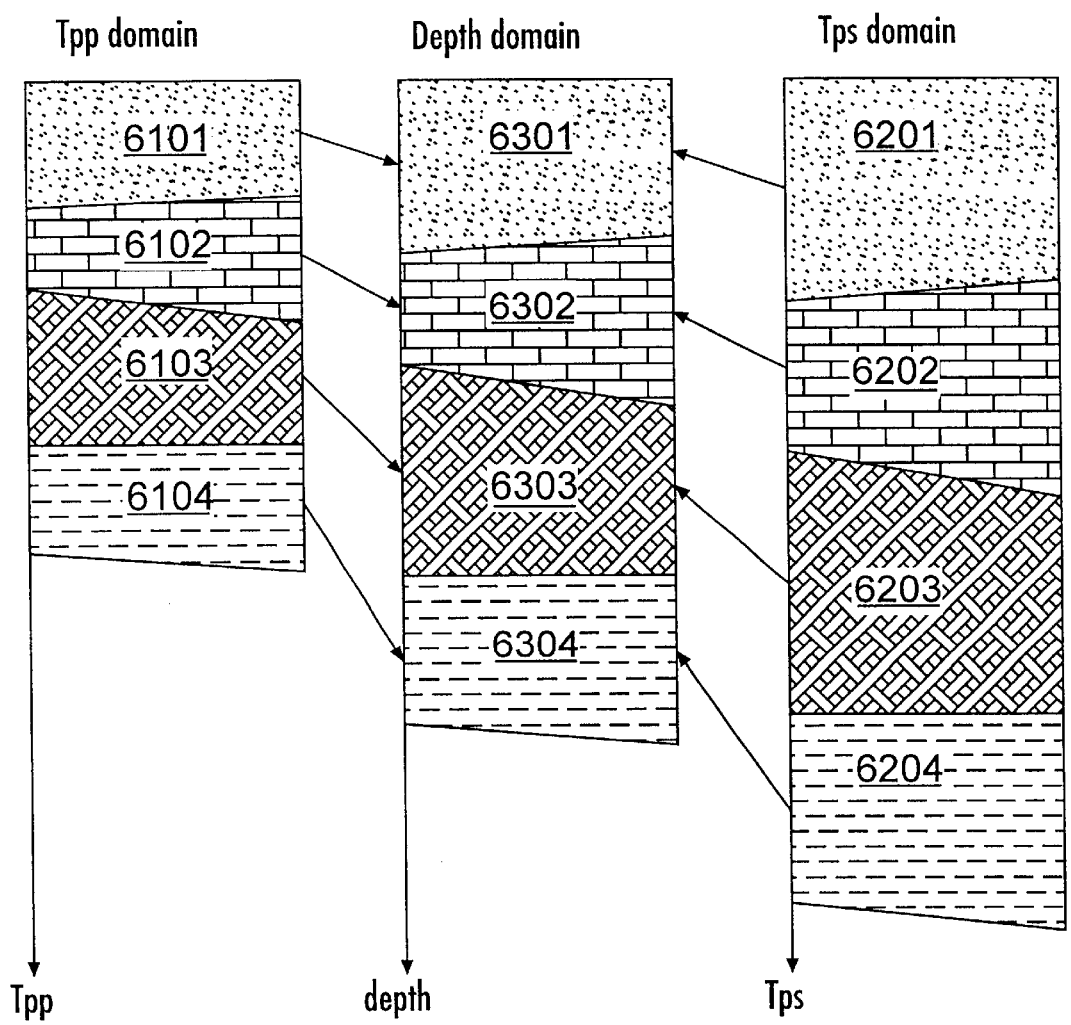
FIG. 6 is a diagram demonstrating the depth-consistent geological model after of an example embodiment joint inversion.

In an even further embodiment, after the depth consistent velocity field is obtained for the selected layer, the inverted Vp and Vs are output and a layer stripping is performed to proceed next layer's joint velocity inversion until joint inversion is completed for all layers sequentially from shallow to deep. In an even further embodiment, as shown in FIG. 6, both P- and S-wave velocity are depth-consistent in depth domain. The P—P model in Tpp domain and P–S model in Tps domain are mapped to the same depth domain after joint inversion.

Figure 7:
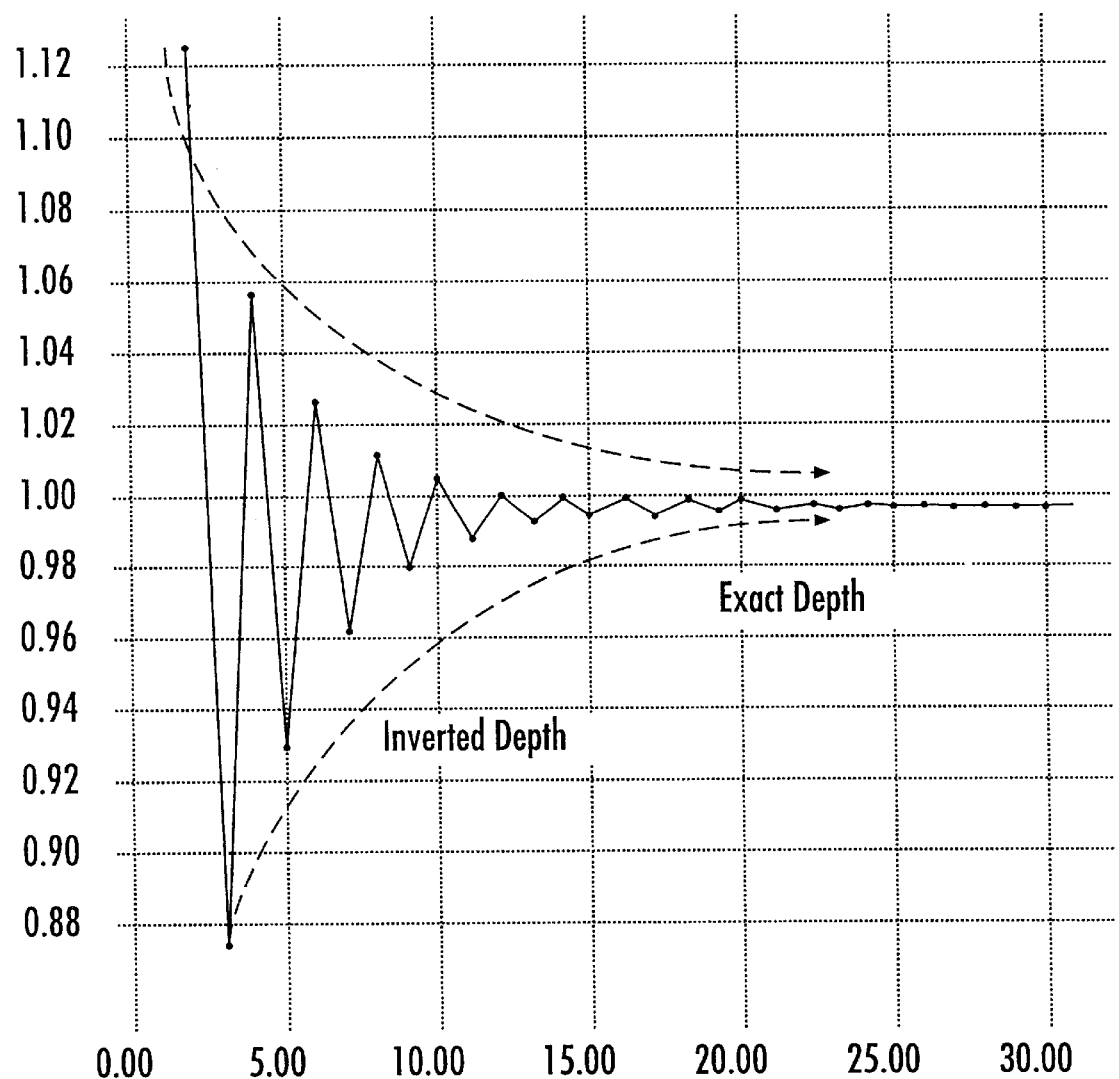
FIG. 7 is a diagram of the reliable theoretical result demonstrating the fast convergence of a single layer depth using an example embodiment of the invention.
Figure 8:
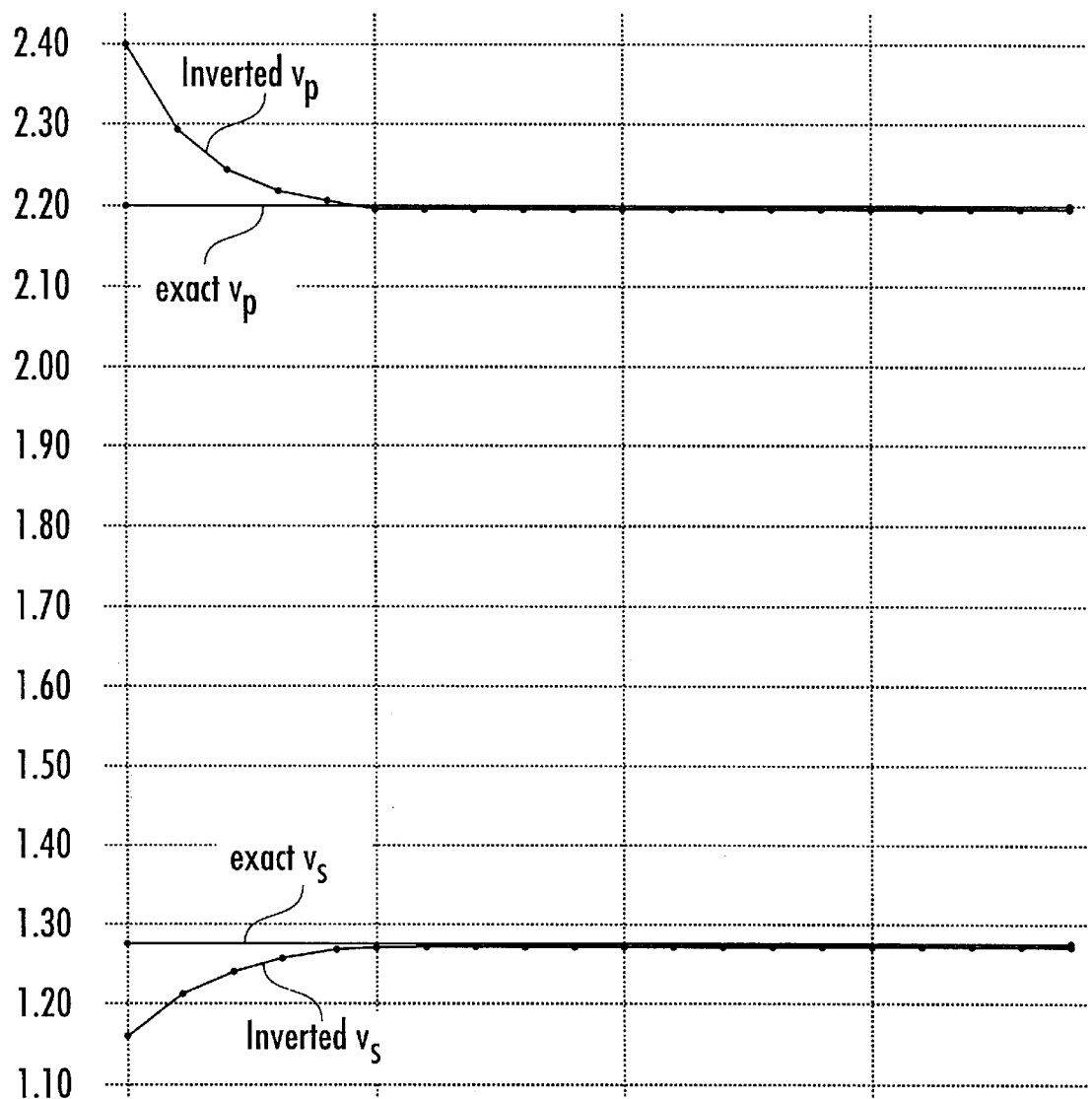
FIG. 8 is a diagram of the reliable theoretical velocity results demonstrating fast convergence of the inverted interval P-wave and S-wave velocities using an example embodiment of the invention.
Figure 9:
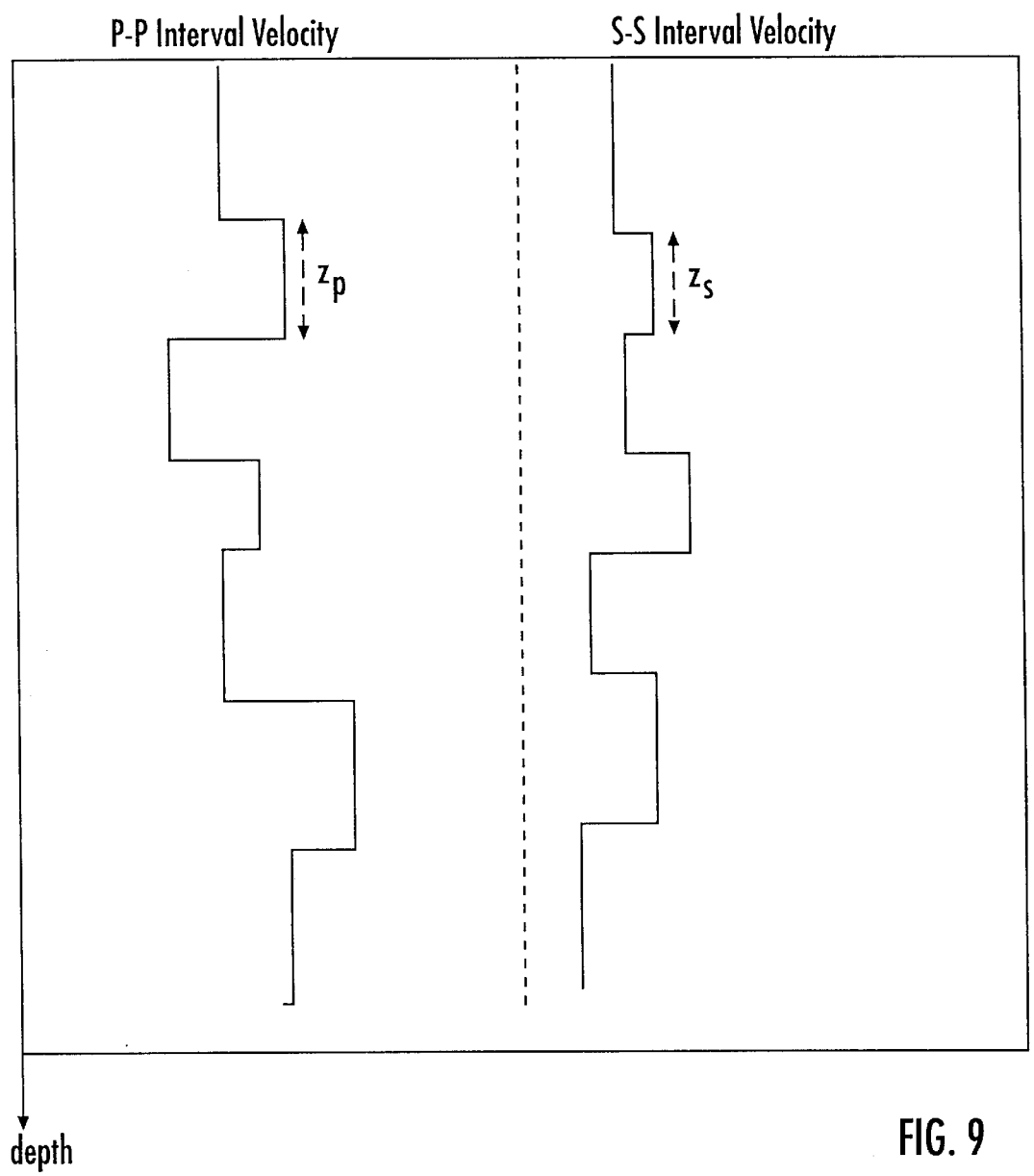
FIG. 9 is a diagram of aspects of an example embodiment of the invention in multi-layered medium for layer stripping.
Figure 10:
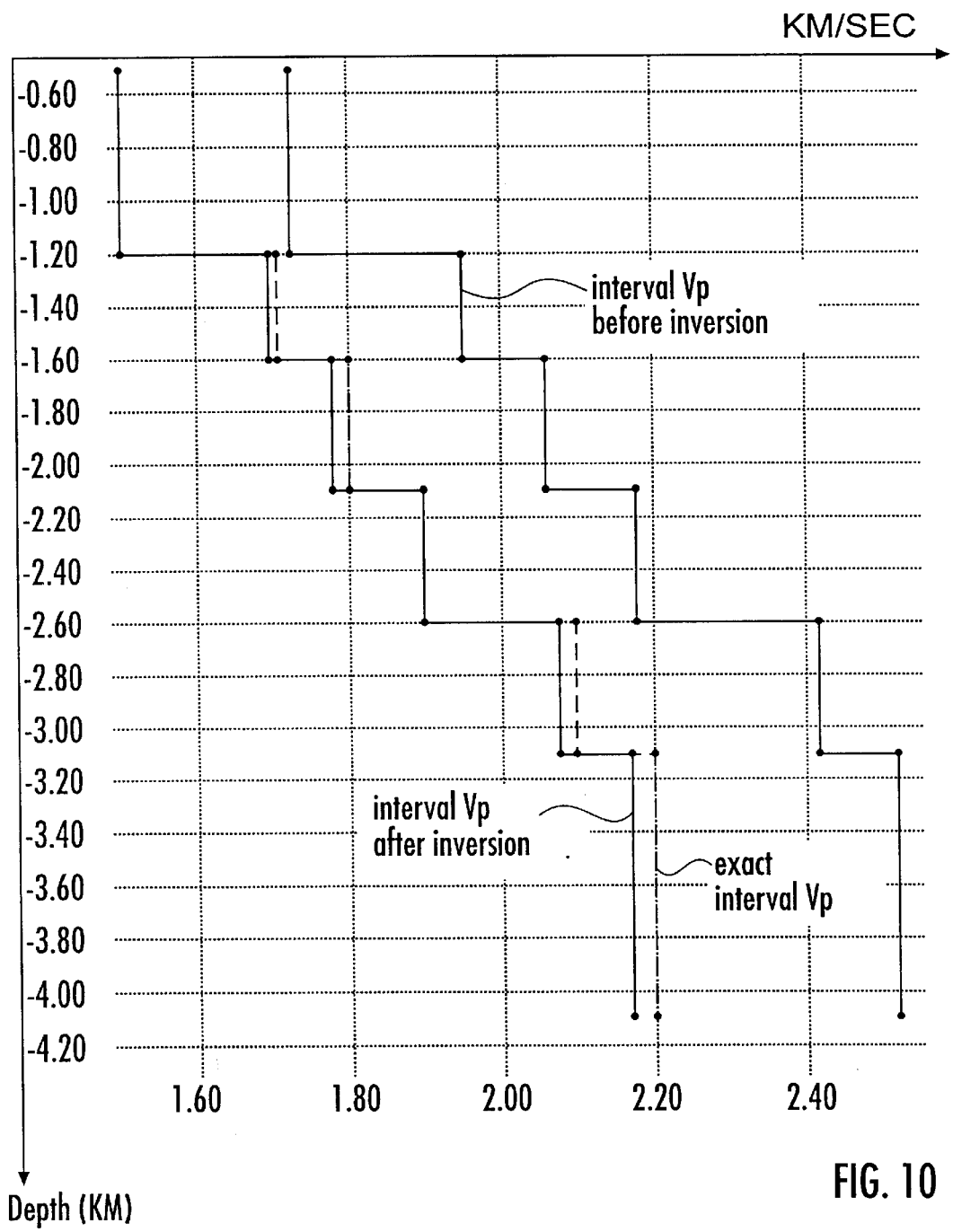
FIG. 10 is a diagram of results of an example embodiment using the inverted interval P-wave velocities from a multi-layered medium.
Figure 11:
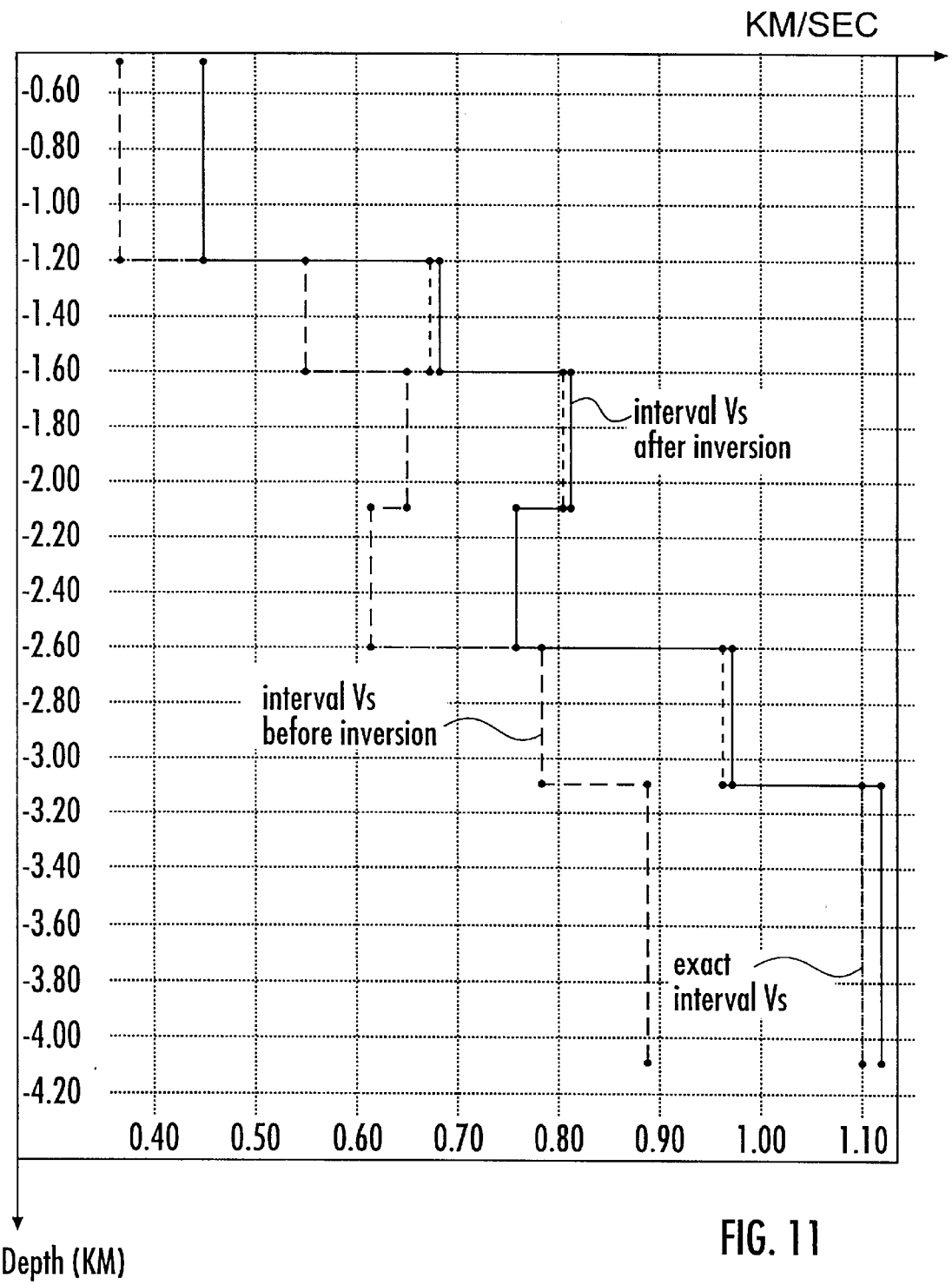
FIG. 11 is a diagram of the results of an example embodiment using the inverted interval S-wave velocities from a multi-layered medium.

In an even further embodiment, as illustrated in FIG. 7, the inverted depth converges to exact depth with 15 iterations in a theoretical model in the joint inversion process. FIG. 8 shows the fast convergence of the inverted P-and S-wave interval velocities in less than 5 iterations in an example embodiment of the joint inversion process. FIG. 9 is a diagram of the aspects of a further embodiment for multi-layered medium layer stripping during the joint inversion. FIG. 10 illustrates the results of P-wave interval velocities before and after and example embodiment of joint velocity inversion. FIG. 11 shows the results of S-wave interval velocities before and after and example embodiment of joint velocity inversion. It has been proven that the joint inversion is very stable on multi-layered medium. The average RMS velocity error is tolerated up to 25% and accuracy of the inverted interval P- and S-wave velocities is within 5%.

Figure 12:
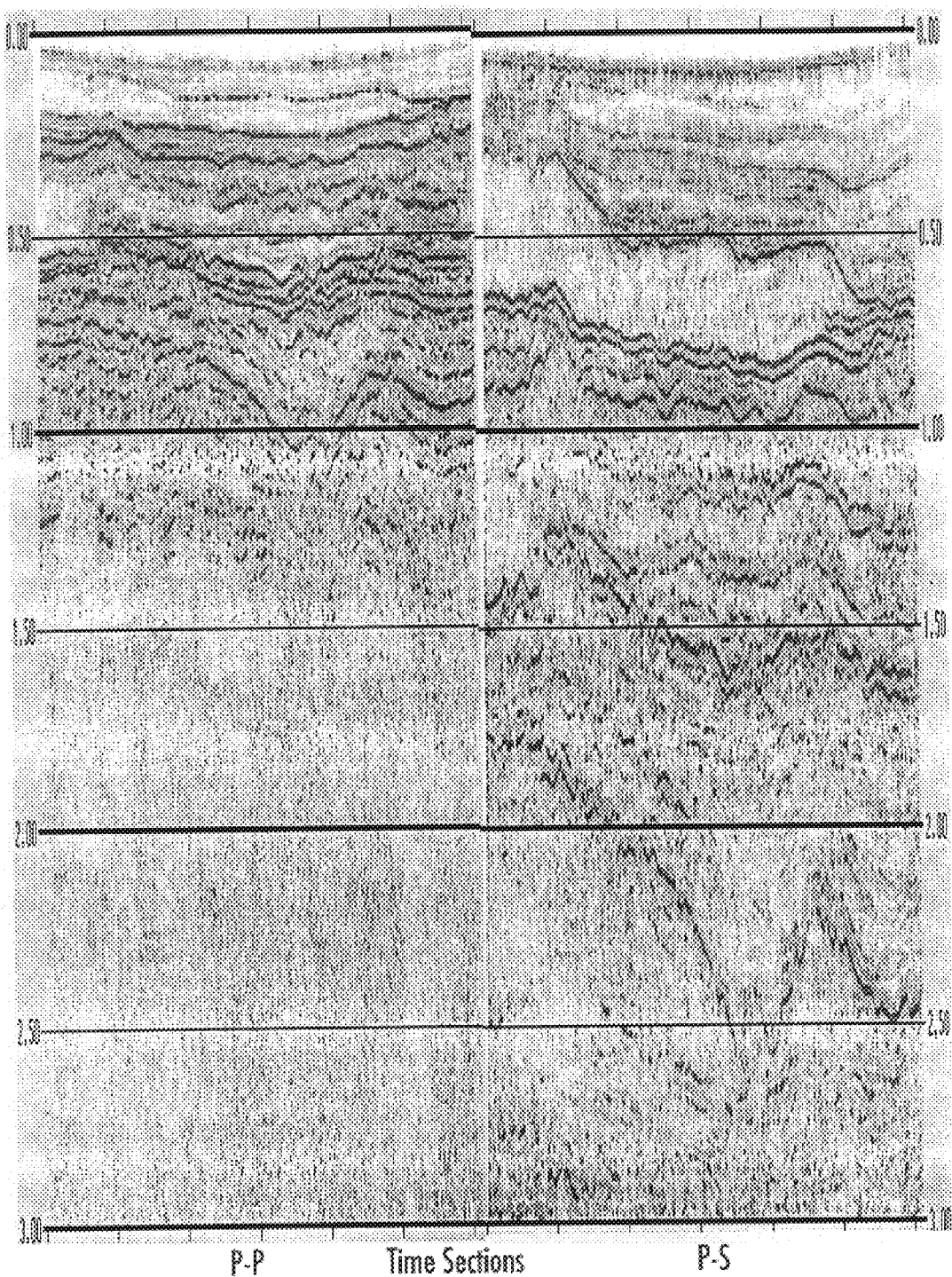
FIG. 12 are the P—P and P–S time sections before applying an example embodiment of the invention. P—P and P–S sections are mismatched in time.
Figure 13:
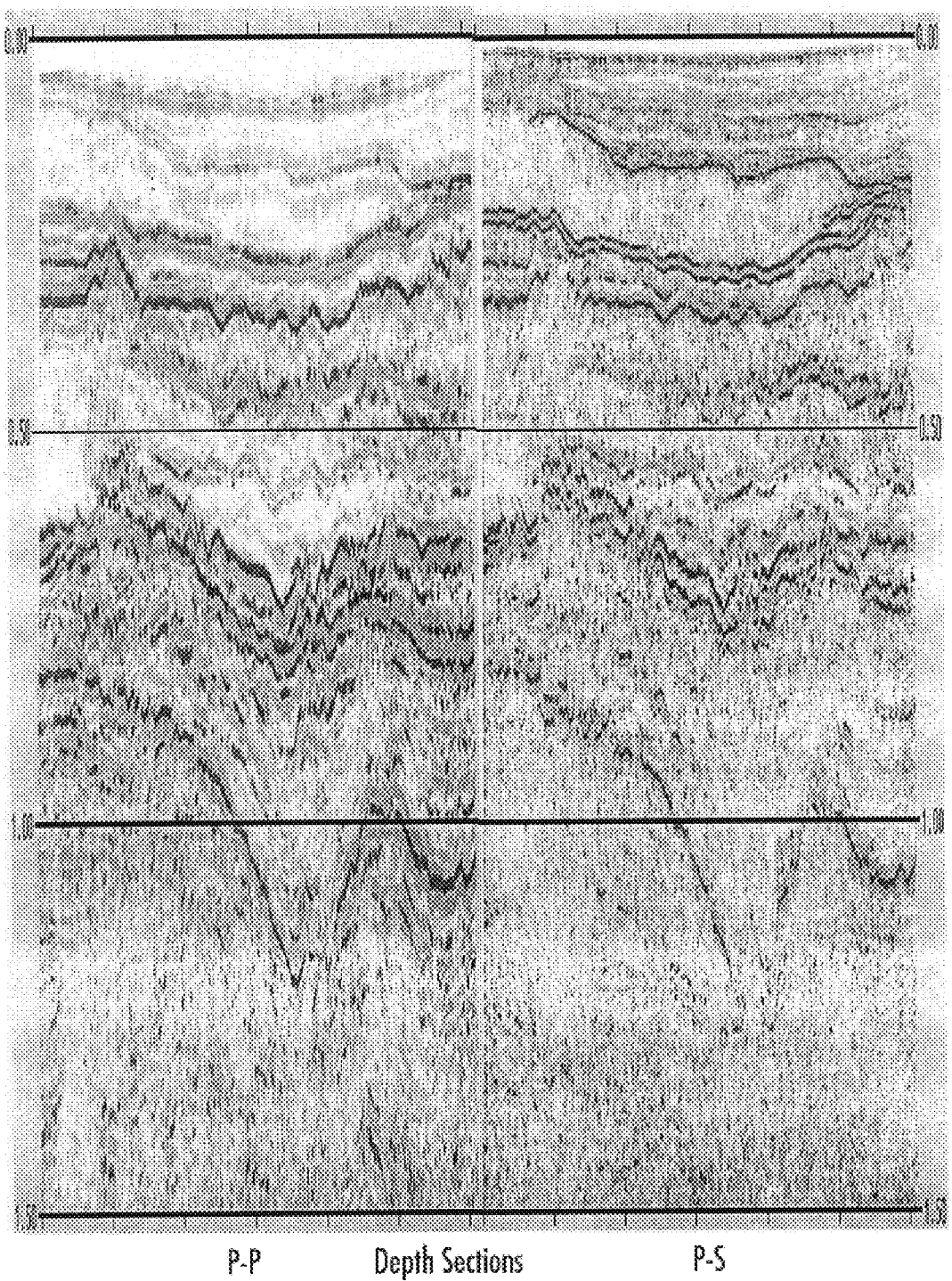
FIG. 13 are the P—P and P–S depth sections after applying an example embodiment of the invention to map time to depth. P—P and P–S sections are depth consistent and matched in depth.

FIG. 12 shows real seismic data of P—P and P–S time-migrated sections before an example embodiment of velocity inversion. The two time-migrated sections are clearly mismatched in time. FIG. 13 shows the P—P and P–S depth sections after one example embodiment of joint inversion. Both P—P and P–S sections are matched in depth domain after joint velocity inversion. It has proven that the joint velocity inversion has successfully reconciled the depth between P—P and P–S. The depth-consistent P- and S-wave sections produce enhanced seismic traces for the upgraded delineation of subsurface structures. The converted P- and S-wave images in depth domain is better for identification of the geological framework and risk reduction in reservoir management. The invention is suited for multicomponent seismic data preprocessing and interpretation.

Figure 14:
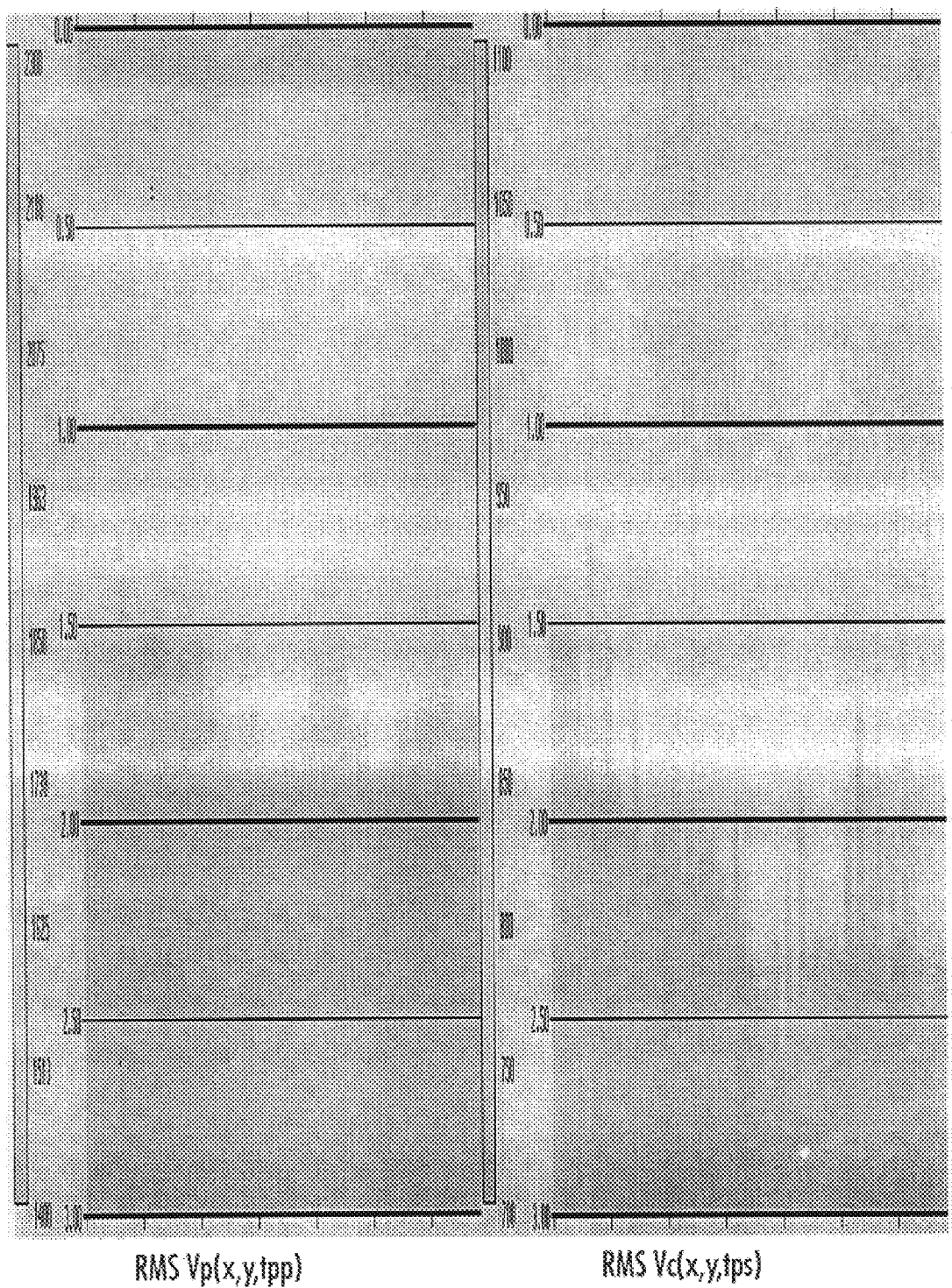
FIG. 14 is a diagram of the RMS P—P and P–S velocity sections before applying an example embodiment of the invention.
Figure 15:
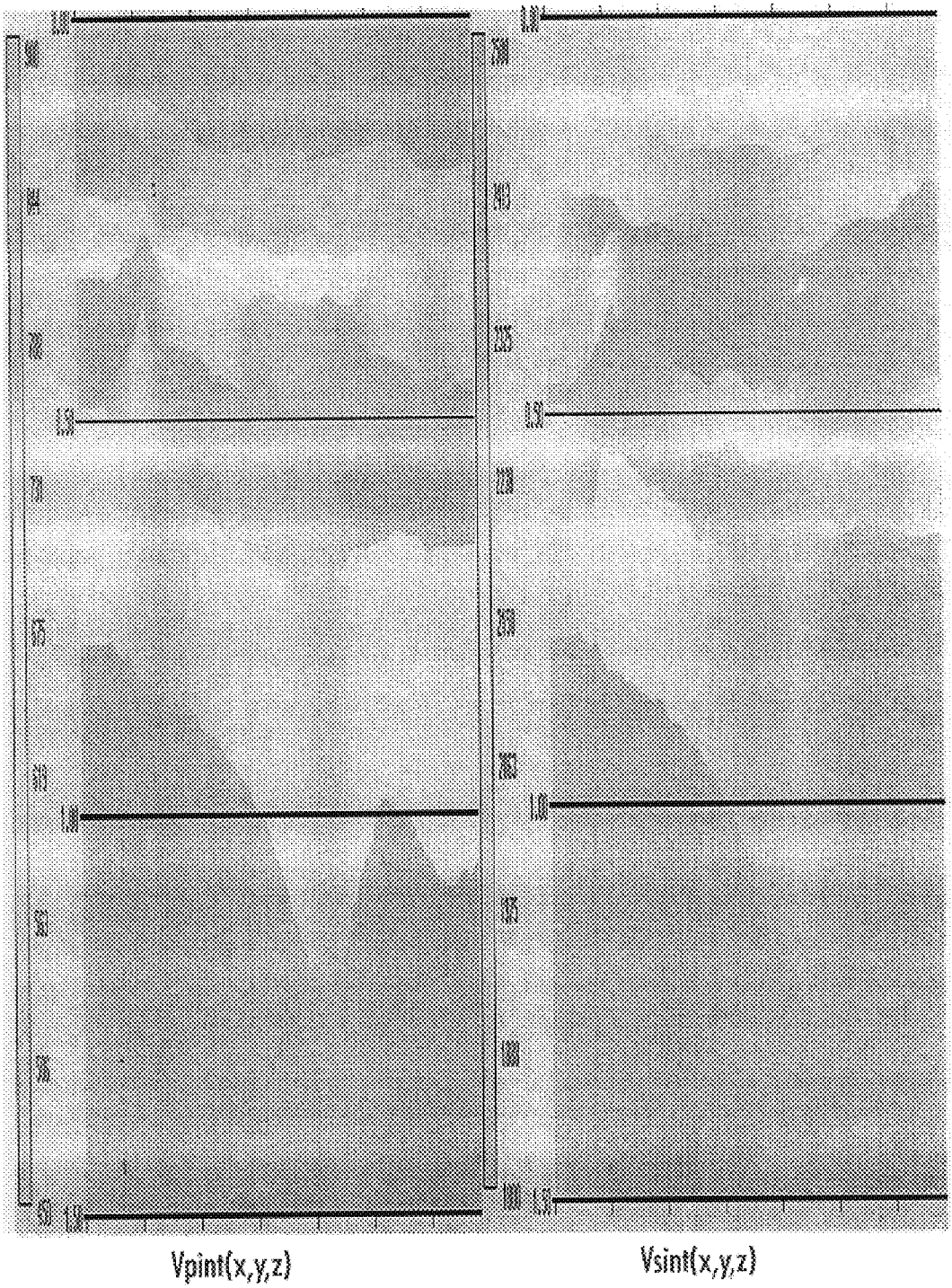
FIG. 15 are the interval P—P and S—S velocity sections after the applying an example embodiment of the invention to the velocity field. Both P—P and S—S velocity sections are tied in depth.

FIG. 14 shows the RMS velocity fields of P—P and P–S in time domain before one embodiment of joint inversion. There is no direct tie between two velocity sections in time. FIG. 15 shows the P- and S-wave interval velocities sections in depth after joint inversion. They are clearly depth consistent and are used for prestack depth imaging and extraction of lithologic information.

In a further embodiment of the present invention a method for geophysical exploration utilizing joint velocity inversion to extract P—P and S—S interval velocities from multicomponent seismic data is provided. The method comprises mapping P-wave RMS velocity from Tpp domain to Tps domain, computing the S-wave RMS velocity in Tps domain, mapping the S-wave RMS velocity from Tps domain to Tss domain; providing the generalized initial interval velocity computation in time domain; providing the multicomponent velocity updating in depth domain, providing a depth-consistent velocity modeling method; providing a depth computation for multicomponent seismic data; providing the layer stripping method for multi-layered medium velocity inversion; providing the accurate velocity model for prestack depth imaging, providing the depth-consistent P- and S-wave models for better identification of the geological framework and risk reduction in reservoir management, and providing the method that significant reduces the turn around time to deliver depth-consistent migrated seismic data.

In an even further embodiment, mapping of P-wave RMS velocity from Tpp domain to Tps domain comprises providing the Tpp-to-Tps time index matching table and interpolation of the P-wave RMS velocity field in Tps domain.

$$v_p(t_{ps}) = v_p\left(\frac{1 + v_s/v_p}{2v_s/v_p} t_{pp}\right)$$

wherein:

$v_p$ is the P-wave velocity;

$v_s$ is the S-wave velocity;

$t_{pp}$ is the two way P-wave travel time; and $t_{ps}$ is the two way P–S travel time.

In an even further embodiment, computation of S-wave RMS velocity in Tps domain comprises:

$$Vs_{rms}(x,y,t_{ps}) = G_{rms}(x,y,t_{ps}) Vp_{rms}(x,y,t_{ps})$$

wherein:

$G_{rms}$(x,y,tps) comprises the ratio of S-wave RMS velocities in Tps domain; and $Vp_{rms}$(x,y,tps) comprises the P-wave RMS velocities in Tps domain.

In an even further embodiment, mapping of S-wave RMS velocity from Tps domain to Tss domain comprises providing the Tps-to-Tss time index matching table and interpolation of the S-wave RMS velocity field in Tps domain.

$$v_s(t_{ss}) = v_s\left(\frac{2}{1 + v_s/v_p} t_{ps}\right)$$

wherein:

$v_p$ is the P-wave velocity;

$v_s$ is the S-wave velocity;

$t_{ss}$ is the two way S-wave travel time; and $t_{ps}$ is the two way P-S travel time.

In an even further embodiment, providing the generalized interval velocity in time domain for P—P and S—S data comprises:

$$v_{int}^2(N) = \frac{[T(N) - T_c]v_{rms}^2(N) - [T(N-1) - T_c]v_{rms}^2(N-1)}{T(N) - T(N-1)}$$

wherein:

Vint(N) comprises the Nth layer interval velocity;

T(N) comprises the total travel time from the first layer to Nth layer;

T(N−1) comprises the total travel time from the first layer to the (N−1)th layer;

Vrms(N) comprises the RMS velocity at Nth layer;

Vrms(N−1) comprises the RMS velocity at (N−1)th layer; and

Tc comprises the vertical one-way travel time from the source datum plane to the receiver datum plane.

In an even further embodiment, providing the multicomponent velocity updating in depth domain comprises:

$$v_{new} = v_{old} + \Delta v$$

wherein:

$v_{new}$ is the updated velocity;

$v_{old}$ is the previously computed velocity; and $\Delta v$ is the velocity error correction component.

In an even further embodiment, the velocity error correction comprises the P-wave velocity correction:

$$v_p(\text{new}) = v_p(\text{old}) + \left(1 - \frac{v_s(\text{old})}{v_p(\text{old})}\right)\frac{z_p - z}{t_p}$$

wherein:

$v_p$(new) is the new updated S-wave velocity;

$v_p$(old) is the previously computed P-wave velocity;

$v_s$(old) is the previously computed S-wave velocity;

$z_s$ is the depth computed from S-wave velocity field;

$t_p$ is the one-way P-wave travel time; and z is the depth computed from the joint velocity field.

In an even further embodiment, the velocity error correction comprises the S-wave $$v_s(\text{new}) = v_s(\text{old}) + \frac{v_s(\text{old})}{v_p(\text{old})}\right)\frac{z_s - z}{t_s}$$

velocity correction:
wherein:
$v_p(\text{new})$ is the new updated S-wave velocity;
$v_p(\text{old})$ is the previously computed P-wave velocity;
$v_s(\text{old})$ is the previously computed S-wave velocity;
$z_s$ is the depth computed from S-wave velocity field;
$t_s$ is the one-way S-wave travel time; and
z is the depth computed from the joint velocity field.

In an even further embodiment, the depth computed from P-wave velocity field comprises:

$$z_p = t_p v_p(\text{old})$$

wherein:
$t_p$ is the one-way P-wave travel time; and
$v_p(\text{old})$ is the computed P-wave velocity.

In an even further embodiment, depth computed from S-wave velocity field comprises:

$$z_s = t_s v_s(\text{old})$$

wherein:
$t_s$ is the one-way S-wave travel time; and
$v_s(\text{old})$ is the computed S-wave velocity.

In an even further embodiment, the depth computed from joint velocity field comprises:

$$z = \frac{1}{2}(z_p + z_s)$$

wherein:
$z_p$ is the depth computed from P-wave velocity field; and
$z_s$ is the depth computed from S-wave velocity field.

In an even further embodiment, the method further comprises providing the depth computation multicomponent seismic data so that the error is minimized. In an even further embodiment, the method further comprises providing the depth consistent velocity modeling method so that multicomponent attributes are jointly analyzed and displayed.

In an even further embodiment, providing the layer stripping method for multi-layered medium velocity inversion comprises, stripping the first layer, then the second layer, until all layers are inverted.

In an even further embodiment, providing an accurate velocity model for prestack depth imaging comprises providing the P-wave velocity model in depth, providing the S-wave velocity model in depth, providing the ratio of S-wave velocity to P-wave velocity in depth, and providing the multicomponent velocity combination model in depth.

In an even further embodiment, the providing the P-wave velocity model in depth comprises a three dimension P-wave velocity model:

$$Vp(x,y,z)$$

wherein:
x and y define the surface location and z defines the depth.

In an even further embodiment, the providing the S-wave velocity model in depth comprises a three dimension S-wave velocity model:

$$Vs(x,y,z)$$

wherein:
x and y define the surface location and z defines the depth.

In an even further embodiment, the providing the multi-component velocity combination model in depth comprises, providing the ratio of the S-wave interval velocity to the P-wave interval velocity, providing the ratio of the P-wave interval velocity to the S-wave interval velocity, and providing the C-wave interval velocity.

In an even further embodiment, the providing ratio of the S-wave interval velocity to the P-wave interval velocity in depth comprises, $$Vs(x,y,z)/Vp(x,y,z)$$

wherein:
$Vs(x,y,z)$ is the S-wave interval velocity in depth; and
$Vp(x,y,z)$ is the P-wave interval velocity in depth.

In an even further embodiment, the providing ratio of the P-wave interval velocity to the S-wave interval velocity in depth comprises:

$$Vp(x,y,z)/Vs(x,y,z)$$

wherein:
$Vs(x,y,z)$ is the S-wave interval velocity in depth; and
$Vp(x,y,z)$ is the P-wave interval velocity in depth.

In an even further embodiment, the providing C-wave interval velocity in depth comprises:

$$Vc(x,y,z) = 2Vp(x,y,z)Vs(x,y,z)/[Vp(x,y,z)+Vs(x,y,z)]$$

wherein:
$Vs(x,y,z)$ is the S-wave interval velocity in depth; and
$Vp(x,y,z)$ is the P-wave interval velocity in depth.

In an even further embodiment, the providing the depth-consistent P- and S-wave models for better identification of the geological framework and risk reduction in reservoir management comprises, providing the mapping of geological model from Tpp domain to depth domain, and providing the mapping of geological model from Tps domain to depth domain.

In and even further embodiment, the providing the mapping of geological model from Tpp domain to depth domain comprises:

$$\text{P—P model }(x,y,z) = \text{P—P model }(x,y,t_p v_p)$$

wherein:
$(x,y,z)$ is in depth domain; and
$(x,y,t_p v_p)$ is in Tpp domain.

In an even further embodiment, the providing the mapping of geological model from Tps domain to depth domain comprises:

$$\text{P–S model }(x,y,z) = \text{P–S model }(x,y,Vst_{ps}/[1+Vs/Vp])$$

wherein:
$(x,y,z)$ is in depth domain; and
$(x,y,Vst_{ps}/[1+Vs/Vp])$ is in Tps domain.

In an even further embodiment, the method that significantly reduces the turn around time to deliver depth consistent migrated seismic data comprises, providing the P—P depth data mapped from time-migrated data, providing the P–S depth data mapped from time-migrated data, providing the P-wave velocity depth model, and providing the S-wave velocity depth model.

In an even further embodiment, the P—P depth data mapped from time-migrated data comprises the conversion of P—P seismic data from Tpp domain to depth domain.

In an even further embodiment, the P–S depth data mapped from time-migrated data comprises the conversion of P–S seismic data from Tps domain to depth domain.

In an even further embodiment, the P-wave velocity depth model comprises the construction of P—P velocity model in depth domain.

In even further embodiment, the S-wave velocity depth model comprises the construction of S—S velocity model in depth domain.

In a further embodiment of the present invention, a system is provided. The system comprises means for receiving the recorded P—P and P–S seismic traces representing the reflections of compressional to compressional wave and compressional to shear wave seismic energies reflected from subsurface formations.

In a further embodiment, the system comprises means for a seismic source and a means or receiving multicomponent seismic data. In alternate embodiments, means for a source are airgun, dynamite or any other means that will occur to those of ordinary skill in the art. In alternate embodiments, means for receiving comprise hydrophones, geophones, 4-C phones, accelerometers, gravity receivers, or any other device that will occur to those of ordinary skill in the art.

In a further embodiment, the system comprises means for migration. In alternate embodiments means for migration comprise a computer, a workstation, software running on any computer or any other means that will occur to those of ordinary skill in the art. In a further embodiment, a means for zero offset mapping is provided. In alternate embodiments means for zero offset mapping comprise a computer, a workstation, software running on any computer or any other means that will occur to those of ordinary skill in the art. In a further embodiment, means for determining a travel time is provided. In alternate embodiments means for determining a travel time comprise a computer, a workstation, software running on any computer or any other means that will occur to those of ordinary skill in the art.

The system further comprises means for estimating P-wave RMS velocity from P-wave data. In alternate embodiments means for estimating P-wave RMS velocity from P-wave data comprise a computer, a workstation, software running on any computer or any other means that will occur to those of ordinary skill in the art.

In an even further embodiment, means for estimating RMS Vs/Vp ratio from P–S data is provided. In alternate embodiments means for estimating comprise a computer, a workstation, software running on any computer or any other means that will occur to those of ordinary skill in the art.

In an even further embodiment, the system further comprises means for computing P-wave RMS velocity in Tps domain. In alternate embodiments means for computing comprise a computer, a workstation, software running on any computer or any other means that will occur to those of ordinary skill in the art.

In an even further embodiment, the system comprises means for computing the RMS Vs/Vp ratio in Tps domain. In alternate embodiments means for computing comprise a computer, a workstation, software running on any computer or any other means that will occur to those of ordinary skill in the art.

In an even further embodiment, the system further comprises means for computing the RMS S-wave velocity in Tss domain. In alternate embodiments means for computing comprise a computer, a workstation, software running on any computer or any other means that will occur to those of ordinary skill in the art.

In an even further embodiment, the system comprises means for computing the interval P-wave interval velocity in Tpp domain. In alternate embodiments means for computing comprise a computer, a workstation, software running on any computer or any other means that will occur to those of ordinary skill in the art.

In an even further embodiment, the system comprises means for computing the interval S-wave interval velocity in Tss domain. In alternate embodiments means for computing comprise a computer, a workstation, software running on any computer or any other means that will occur to those of ordinary skill in the art.

In an even further embodiment, the system comprise means for computing P- and S-wave interval velocities in depth domain. In alternate embodiments means for computing comprise a computer, a workstation, software running on any computer or any other means that will occur to those of ordinary skill in the art.

In an even further embodiment, the system comprises means for updating the computed thicknesses of P—P and P–S for the selected layer. In alternate embodiments means for updating comprise a computer, a workstation, software running on any computer or any other means that will occur to those of ordinary skill in the art.

In an even further embodiment, the system comprises means for checking depth-consistent P- and S-wave velocity fields. In alternate embodiments means for checking comprise a computer, a workstation, software running on any computer or any other means that will occur to those of ordinary skill in the art.

In an even further embodiment, the system comprises means for balancing the depths and compute new velocity errors for both P-wave and S-wave velocities if depth-consistent velocity field is not obtained. In alternate embodiments means for balancing comprise a computer, a workstation, software running on any computer or any other means that will occur to those of ordinary skill in the art.

In an even further embodiment, means for outputting the inverted interval P-wave and S-wave velocities and means for performing layer stripping are provided. In alternate embodiments means for outputting comprise a computer, a workstation, software running on any computer or any other means that will occur to those of ordinary skill in the art. In alternate embodiments means for performing layer stripping comprise a computer, a workstation, software running on any computer or any other means that will occur to those of ordinary skill in the art.

In a further embodiment, the system comprises means for estimating $Vp(x,y,t_{pp})$ from migration velocity analysis. In alternate embodiments means for estimating comprise a computer, a workstation, software running on any computer or any other means that will occur to those of ordinary skill in the art. In yet a further embodiment, the system comprises means for picking the P-wave velocities. In alternate embodiments means for picking comprise a computer, a workstation, software running on any computer or any other means that will occur to those of ordinary skill in the art. In a further embodiment, the system comprises means for scanning. In alternate embodiments means for scanning comprise a computer, a workstation, software running on any computer or any other means that will occur to those of ordinary skill in the art. In an even further embodiment, the system comprises means for estimating the velocity ratio for each zero-offset. In alternate embodiments means for estimating comprise a computer, a workstation, software running on any computer or any other means that will occur to those of ordinary skill in the art.

In still a further embodiment, means for performing non-hyperbolic Vs/Vp ratio coherency scan on the P–S converted wave data is provided. In alternate embodiments means for performing comprise a computer, a workstation, software running on any computer or any other means that will occur to those of ordinary skill in the art.

In an even further embodiment, the system comprises means for mapping. In alternate embodiments means for mapping comprise a computer, a workstation, software running on any computer or any other means that will occur to those of ordinary skill in the art. In a further embodiment, the system comprises means for computation of S-wave RMS velocities. In alternate embodiments means for computing comprise a computer, a workstation, software running on any computer or any other means that will occur to those of ordinary skill in the art.

In yet a further embodiment, the system comprises means for computing both P-wave and S-wave interval velocities in depth. In alternate embodiments means for computing comprise a computer, a workstation, software running on any computer or any other means that will occur to those of ordinary skill in the art.

In an even further embodiment, the system comprises means for estimating the initial P- and S-wave velocities from the P—P and P–S travel times from the seismic data. In alternate embodiments means for estimating comprise a computer, a workstation, software running on any computer or any other means that will occur to those of ordinary skill in the art.

In still a further embodiment, the system comprises means for determining the updated interval velocities for both P and S-waves. In alternate embodiments means for determining comprise a computer, a workstation, software running on any computer or any other means that will occur to those of ordinary skill in the art.

In a further embodiment, the system comprises means for updating a new depth. In alternate embodiments means for updating comprise a computer, a workstation, software running on any computer or any other means that will occur to those of ordinary skill in the art.

In an even further embodiment, the system comprises means for computing the optimized depth-consistent velocity field. In alternate embodiments means for computing comprise a computer, a workstation, software running on any computer or any other means that will occur to those of ordinary skill in the art.

In an even further embodiment, the system comprises means for outputting the inverted Vp and Vs and means for layer stripping. In alternate embodiments means for outputting comprise a computer, a workstation, software running on any computer or any other means that will occur to those of ordinary skill in the art. In alternate embodiments means for layer stripping comprise a computer, a workstation, software running on any computer or any other means that will occur to those of ordinary skill in the art. In an even further embodiment, the system comprises means for mapping to the same depth domain after joint inversion.

In a further embodiment of the present invention a system for geophysical exploration utilizing joint velocity inversion to extract P—P and S—S interval velocities from multicomponent seismic data is provided. The system comprises means for mapping P-wave RMS velocity from Tpp domain to Tps domain. In alternate embodiments means for mapping comprise a computer, a workstation, software running on any computer or any other means that will occur to those of ordinary skill in the art. The system comprises means for computing the S-wave RMS velocity in Tps domain. In alternate embodiments means for computing comprise a computer, a workstation, software running on any computer or any other means that will occur to those of ordinary skill in the art. The system comprises means for mapping the S-wave RMS velocity from Tps domain to Tss domain. In alternate embodiments means for mapping comprise a computer, a workstation, software running on any computer or any other means that will occur to those of ordinary skill in the art. The system comprises means for providing the generalized initial interval velocity computation in time domain. In alternate embodiments means for providing comprise a computer, a workstation, software running on any computer or any other means that will occur to those of ordinary skill in the art. The system comprises means for providing the multicomponent velocity updating in depth domain. In alternate embodiments means for providing comprise a computer, a workstation, software running on any computer or any other means that will occur to those of ordinary skill in the art. The system comprises means for providing a depth-consistent velocity modeling; providing a depth computation for multicomponent seismic data. In alternate embodiments means for providing comprise a computer, a workstation, software running on any computer or any other means that will occur to those of ordinary skill in the art. The system comprises means for providing the layer stripping. In alternate embodiments means for providing comprise a computer, a workstation, software running on any computer or any other means that will occur to those of ordinary skill in the art. The system comprises means for providing the accurate velocity model for prestack depth imaging. In alternate embodiments means for providing comprise a computer, a workstation, software running on any computer or any other means that will occur to those of ordinary skill in the art. The system comprises means for providing the depth-consistent P- and S-wave models for better identification of the geological framework and risk reduction in reservoir management. In alternate embodiments means for providing comprise a computer, a workstation, software running on any computer or any other means that will occur to those of ordinary skill in the art. The system comprises means for providing the reduction of the turn around time to deliver depth-consistent migrated seismic data. In alternate embodiments means for providing comprise a computer, a workstation, software running on any computer or any other means that will occur to those of ordinary skill in the art.

In an even further embodiment, means for mapping of P-wave RMS velocity from Tpp domain to Tps domain comprises means for providing the Tpp-to-Tps time index matching table and interpolation of the P-wave RMS velocity field in Tps domain. In alternate embodiments means for providing comprise a computer, a workstation, software running on any computer or any other means that will occur to those of ordinary skill in the art.

In an even further embodiment, means for mapping of S-wave RMS velocity from Tps domain to Tss domain comprises means for providing the Tps-to-Tss time index matching table and interpolation of the S-wave RMS velocity field in Tps domain. In alternate embodiments means for providing comprise a computer, a workstation, software running on any computer or any other means that will occur to those of ordinary skill in the art.

In an even further embodiment, the system further comprises means for providing the depth computation multicomponent seismic data so that the error is minimized. In alternate embodiments means for providing comprise a computer, a workstation, software running on any computer or any other means that will occur to those of ordinary skill in the art. In an even further embodiment, the system further comprises means for providing the depth consistent velocity modeling so that multicomponent attributes are jointly analyzed and displayed. In alternate embodiments means for providing comprise a computer, a workstation, software running on any computer or any other means that will occur to those of ordinary skill in the art.

In an even further embodiment, means for providing the layer stripping for multi-layered medium velocity inversion comprises, means for stripping the first layer, then the second layer, until all layers are inverted. In alternate embodiments means for stripping comprise a computer, a workstation, software running on any computer or any other means that will occur to those of ordinary skill in the art.

In an even further embodiment, means for providing an accurate velocity model for prestack depth imaging comprises means for providing the P-wave velocity model in depth, means for providing the S-wave velocity model in depth, means for providing the ratio of S-wave velocity to P-wave velocity in depth, and means for providing the multicomponent velocity combination model in depth. In alternate embodiments means for providing comprise a computer, a workstation, software running on any computer or any other means that will occur to those of ordinary skill in the art.

In an even further embodiment, the means for providing the multicomponent velocity combination model in depth comprises, means for providing the ratio of the S-wave interval velocity to the P-wave interval velocity, means for providing the ratio of the P-wave interval velocity to the S-wave interval velocity, and means for providing the C-wave interval velocity. In alternate embodiments means for providing comprise a computer, a workstation, software running on any computer or any other means that will occur to those of ordinary skill in the art.

In an even further embodiment, the means for providing the depth-consistent P- and S-wave models for better identification of the geological framework and risk reduction in reservoir management comprises, means for providing the mapping of geological model from Tpp domain to depth domain, and means for providing the mapping of geological model from Tps domain to depth domain. In alternate embodiments means for providing comprise a computer, a workstation, software running on any computer or any other means that will occur to those of ordinary skill in the art.

In an even further embodiment, the system that significantly reduces the turn around time to deliver depth consistent migrated seismic data comprises, means for providing the P—P depth data mapped from time-migrated data, means for providing the P–S depth data mapped from time-migrated data, means for providing the P-wave velocity depth model, and means for providing the S-wave velocity depth model. In alternate embodiments means for providing comprise a computer, a workstation, software running on any computer or any other means that will occur to those of ordinary skill in the art.

In an even further embodiment, the comprises means for construction of P—P velocity model in depth domain. In alternate embodiments means for construction comprise a computer, a workstation, software running on any computer or any other means that will occur to those of ordinary skill in the art.

In even further embodiment, the system comprises means for construction of S—S velocity model in depth domain. In alternate embodiments means for construction comprise a computer, a workstation, software running on any computer or any other means that will occur to those of ordinary skill in the art.

I claim:

1. A method for determining compressional (P) wave and shear (S) wave velocities from seismic data acquired using multiple component receivers, comprising:
   estimating an interval velocity of P waves from earth's surface to a first reflector from P wave arrivals in the seismic data;
   estimating an interval ratio of P wave to S wave velocity from earth's surface to the first reflector from P–S wave arrivals in the seismic data;
   estimating an interval S wave velocity from the estimated interval P wave velocity and interval ratio;
   determining a depth from the earth's surface to the first reflector using each of the P wave and S wave estimated interval velocities; and
   balancing the depths to the first reflector estimated using each of the P wave and S wave estimated interval velocities.

2. The method of claim 1 further comprising:
   layer stripping to the first reflector;
   estimating an interval velocity of P waves from the first reflector to a second reflector from P wave arrivals in the seismic data;
   b) estimating an interval ratio of P wave to S wave interval velocity from the first reflector to the second reflector from P–S wave arrivals in the seismic data;
   c) estimating an interval S wave interval velocity from the estimated inteval P wave velocity and interval ratio;
   d) determining a depth from the earth's surface to the second reflector using each of the P wave and S wave estimated interval velocities and P wave and S wave estimated interval velocities; and
   e) balancing the depth to the second reflector estimated using each of the P wave and S wave estimated interval velocities and estimated P wave and S wave interval velocities.

3. The method of claim 1 wherein the balancing the depth comprises:
   a) calculating a depth from a two way travel time to the earth's surface using both the estimated P wave and estimated S wave interval velocities;
   b) determining a difference between the depth calculated using the P wave and S wave estimated interval velocities;
   c) adjusting the estimated P wave and S wave estimated interval velocities; and
   d) repeating a) through c) until the difference reaches a minimum.

4. The method of claim 1 wherein the estimating the interval P wave and interval S wave velocities comprises estimating from a time migration.

5. A method for seismic exploration, comprising:
   actuating a seismic energy source proximate the earth's surface;
   detecting seismic energy proximate the earth's surface using multiple component seismic detectors;
   estimating an interval velocity of P waves from earth's surface to a first reflector from P wave arrivals in the detected seismic energy;
   estimating an interval ratio of P wave to S wave velocity from earth's surface to the first reflector from P–S wave arrivals in the detected seismic energy;
   estimating an interval S wave velocity from the estimated interval P wave velocity and interval ratio;

determining a depth from the earth's surface to the first reflector using each of the P wave and S wave estimated interval velocities; and balancing the depth to the first reflector estimated using each of the P wave and S wave estimated interval velocities.

6. The method of claim 5 further comprising:

layer stripping to the first reflector;

estimating an interval velocity of P waves from the first reflector to a second reflector from P wave arrivals in the seismic data;

b) estimating an interval ratio of P wave to S wave interval velocity from the first reflector to the second reflector from P–S wave arrivals in the seismic data;

c) estimating an interval S wave interval velocity from the estimated RMS P wave velocity and interval ratio;

d) determining a depth from the earth's surface to the second reflector using each of the P wave and S wave estimated interval velocities and P wave and S wave estimated interval velocities; and e) balancing the depth to the second reflector estimated using each of the P wave and S wave estimated interval velocities and estimated P wave and S wave interval velocities.

7. The method of claim 5 wherein the balancing the depth comprises:

a) calculating a depth from a two way travel time to the earth's surface using both the estimated P wave and estimated S wave interval velocities;

b) determining a difference between the depth calculated using the P wave and S wave estimated interval velocities;

c) adjusting the estimated P wave and S wave estimated interval velocities; and d) repeating a) through c) until the difference reaches a minimum.

8. The method of claim 5 wherein the estimating the interval P wave and interval S wave velocities comprises estimating from a time migration.

9. A system for determining compressional (P) wave and shear (S) wave velocities from seismic data acquired using multiple component receivers, comprising:

means for estimating an interval velocity of P waves from earth's surface to a first reflector from P wave arrivals in the seismic data;

means for estimating an interval ratio of P wave to S wave velocity from earth's surface to the first reflector from P–S wave arrivals in the seismic data;

means for estimating an interval S wave velocity from the estimated interval P wave velocity and interval ratio;

means for determining a depth from the earth's surface to the first reflector using each of the P wave and S wave estimated interval velocities; and means for balancing the depths to the first reflector estimated using each of the P wave and S wave estimated interval velocities.

10. The system of claim 9 comprising:

layer stripping to the first reflector;

means for estimating an interval velocity of P waves from the first reflector to a second reflector from P wave arrivals in the seismic data;

means for estimating an interval ratio of P wave to S wave interval velocity from the first reflector to the second reflector from P–S wave arrivals in the seismic data;

means for estimating an interval S wave interval velocity from the estimated interval P wave velocity and interval ratio;

means for determining a depth from the earth's surface to the second reflector using each of the P wave and S wave estimated interval velocities and P wave and S wave estimated interval velocities; and means for balancing the depth to the second reflector estimated using each of the P wave and S wave estimated interval velocities and estimated P wave and S wave interval velocities.

11. The system of claim 9 wherein the mans for balancing the depth comprises:

means for calculating a depth from a two way travel time to the earth's surface using both the estimated P wave and estimated S wave interval velocities;

means for determining a difference between the depth calculated using the P wave and S wave estimated interval velocities;

means for adjusting the estimated P wave and S wave estimated interval velocities; and means for repeating the calculating a depth, determining a difference and adjusting the estimated interval velocities until the difference reaches a minimum.

12. The system of claim 9 wherein the means for estimating the interval P wave and interval S wave velocities comprises means for estimating from a time migration.

* * * * *